No. 613,146. Patented Oct. 25, 1898.
L. M. HICKS & J. TITUS.
TWO WHEELED VEHICLE.
(Application filed May 18, 1896.)
(No Model.)

Witnesses
Geo. Wadman
Henry S. Read.

Inventors
Leonard M. Hicks
John Titus
per
James A. Whitney
Att'y

THE NORRIS PETERS CO., PHOTO-LITHO., WASHINGTON, D. C.

UNITED STATES PATENT OFFICE.

LEONARD M. HICKS AND JOHN TITUS, OF OYSTER BAY, NEW YORK.

TWO-WHEELED VEHICLE.

SPECIFICATION forming part of Letters Patent No. 613,146, dated October 25, 1898.

Application filed May 18, 1896. Serial No. 591,998. (No model.)

*To all whom it may concern:*

Be it known that we, LEONARD M. HICKS and JOHN TITUS, citizens of the United States, residing at Oyster Bay, in the county of Queens and State of New York, have invented certain new and useful Improvements in Two-Wheeled Vehicles; and we do hereby declare that the following is a full, clear, and exact description of the same, reference being had to the accompanying drawings, making a part of this specification, in which—

Figure 1:
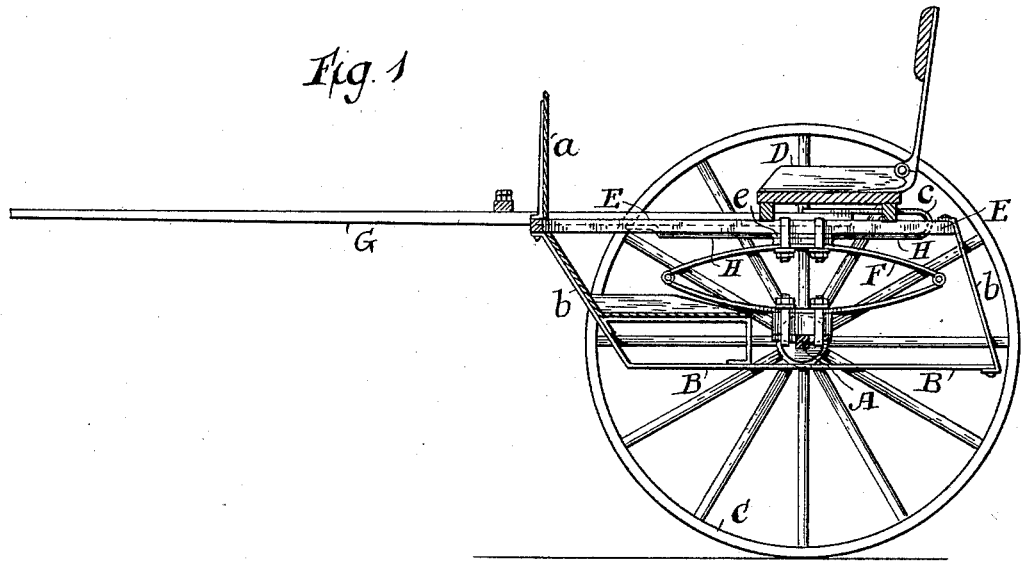
Figure 2:
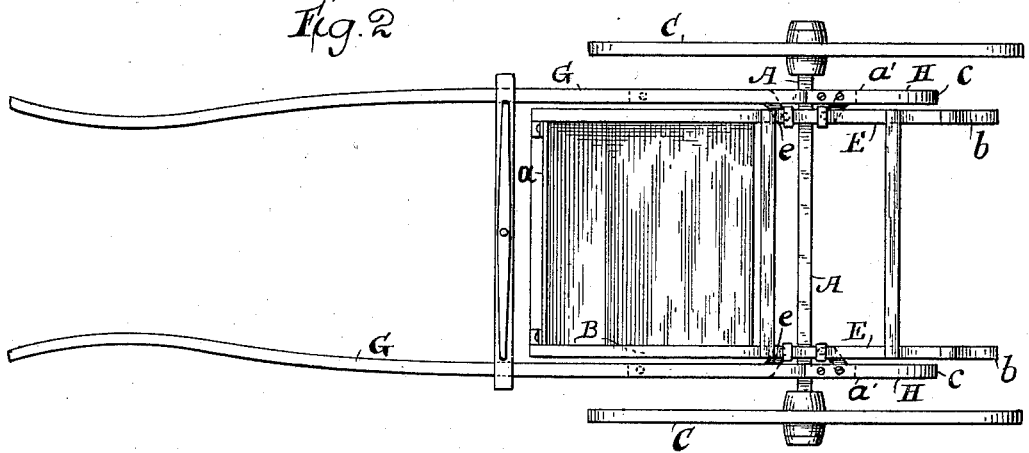
Figure 3:
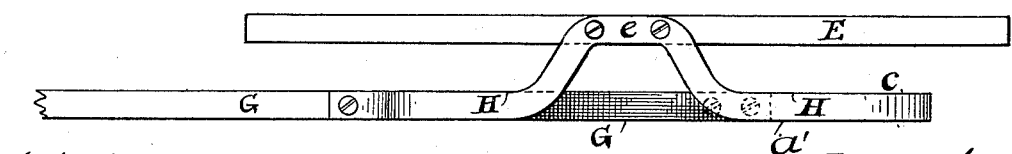

Figure 1 is a vertical longitudinal sectional view, and Fig. 2 a partial plan view, of a vehicle constructed according to our invention. Fig. 3 is a detail view, on a larger scale, of one of the parts inverted of said vehicle.

This invention relates to that class of vehicles which have two wheels and a single axle—such, for example, as those commonly termed "road-carts," "gigs," &c. In such vehicles the more or less horizontal position of the body of the vehicle is for the most part dependent upon the thills when the latter are in position for the draft of the vehicle by a horse or other suitable animal attached thereto. As a consequence the stepping movement of the animal when drawing the vehicle is transmitted to the vehicle-body, thereby inducing discomfort and fatigue on the part of the occupants of the latter.

The object of our invention is to provide an improved means for preventing this source of annoyance, and to this end it comprises certain novel combinations of parts hereinafter fully described and particularized.

A is the axle, B the body, and C the wheels, of the vehicle. These may be of any suitable construction, and the body may and ordinarily is intended to be provided with a suitable seat D, and may have a dashboard $a$. The body rests at each side upon a spring-bar E, which preferably is of tough and elastic wood. Each of these spring-bars E rests as near its middle as may be upon a spring F, which is preferably of the elliptic variety and which in its turn is supported by the axle A. The body B is suspended in position underneath the axle from the spring-bars E by rods or braces $b$ or other suitable means.

G G are the thills of the vehicle. The rear portion of each thill is extended back along the adjacent side of the vehicle parallel with the adjacent spring-bar E. Upon the under side of each thill, at the rear part just mentioned thereof, is provided a leaf-spring H, the ends of which are fast to the thill, but the main portion of which is parallel therewith to such an extent or in such manner as to elastically and more or less flexibly yield to any strain exerted thereon by any change in the position of the thills with reference thereto. As shown in the drawings, these springs are attached at their forward ends to the under sides of the thills, with their rearward ends extended to form a bow $c$, the extremity $a'$ of which is fast to the upper surface of the thill. This construction affords increased resiliency and flexibility to the spring and enables it to respond more quickly to increase and diminution of pressure in various directions upon it in the operation of the apparatus, as herein presently explained.

At any desired place along the length of each of the springs H, but to insure the best results at or near the middle thereof, is provided, preferably integral therewith, a lateral lug $e$, which extends inward and to which is made fast the adjacent spring-bar E in such manner that the thill is suspended from or supported by the spring-bar E, the body B being, as previously explained, suspended at its sides from the spring-bars. The springs H from their structure and their relation to the spring-bars E not only permit of resiliency in a vertical position, but within certain limits permit the thills to assume varying positions with reference to the body B, while at the same time traction applied to the thills is communicated from the latter through the springs H to the spring-bars and from these through the springs F to the axle and through the braces or connections $b$ to the body of the vehicle as the whole is drawn along. By reason of the elastic and somewhat flexible character of the springs H the vertical "joggling" or "horse" movement of the thills when the vehicle is in use is practically absorbed or interrupted by the said springs while on its way to the body of the vehicle, and its transmission to the latter, and consequently to the occupants thereof, is effectually prevented, the structure of the leaf-springs H being, further, such as to provide the strength and firmness necessary to the traction of the vehicle and such as insures the ready and convenient connection of the parts in the requisite relation with each other.

What we claim as our invention is—

1. In a two-wheel vehicle, the combination with an axle, springs supported by said axle, spring-bars supported by said springs, a body below the axle suspended from said spring-bars, and thills arranged with their rear portions parallel or practically so with the spring-bars, of leaf-springs attached at their opposite ends to the thills and having lateral lugs made fast to the spring-bars, all substantially as and for the purpose herein set forth.

2. In a two-wheel vehicle, the combination with an axle, elliptic springs supported by said axle, spring-bars supported by said springs, a body below the axle suspended from said spring-bars, and thills arranged with their rear portions parallel or practically so with the spring-bars, of leaf-springs attached at their opposite ends to the spring-bars constructed with bows, c, at their rear parts to increase their resiliency and with lateral lugs, e, in their middle parts to connect said springs with the spring-bars, all substantially as and for the purpose herein set forth.

LEONARD M. HICKS.
JOHN TITUS.

Witnesses:
ALBERT M. BAYLES,
FRED L. McQUEEN.